(12) United States Patent
Tang et al.

(10) Patent No.: US 9,798,959 B2
(45) Date of Patent: Oct. 24, 2017

(54) METHOD AND SYSTEM FOR RECOGNIZING FACES

(71) Applicant: BEIJING SENSETIME TECHNOLOGY DEVELOPMENT CO., LTD, Beijing (CN)

(72) Inventors: Xiaoou Tang, Hong Kong (CN); Chaochao Lu, Hong Kong (CN); Deli Zhao, Hong Kong (CN)

(73) Assignee: BEIJING SENSETIME TECHNOLOGY DEVELOPMENT CO., LTD, Beijing (CN)

( * ) Notice: Subject to any disclaimer, the term of this patent is extended or adjusted under 35 U.S.C. 154(b) by 0 days.

(21) Appl. No.: 15/100,199

(22) PCT Filed: Nov. 30, 2013

(86) PCT No.: PCT/CN2013/088255
§ 371 (c)(1),
(2) Date: May 27, 2016

(87) PCT Pub. No.: WO2015/078019
PCT Pub. Date: Jun. 4, 2015

(65) Prior Publication Data
US 2017/0004387 A1    Jan. 5, 2017

(51) Int. Cl.
*G06K 9/62*    (2006.01)
*G06K 9/00*    (2006.01)
*G06K 9/46*    (2006.01)

(52) U.S. Cl.
CPC ....... *G06K 9/6276* (2013.01); *G06K 9/00234* (2013.01); *G06K 9/00281* (2013.01);
(Continued)

(58) Field of Classification Search
CPC .......... G06K 9/00234; G06K 9/00281; G06K 9/00288; G06K 9/469; G06K 9/6215; G06K 9/6276
See application file for complete search history.

(56) References Cited

U.S. PATENT DOCUMENTS

2009/0232365 A1    9/2009   Berthilsson et al.
2012/0294511 A1*  11/2012   Datta ................. G06K 9/00771
                                                    382/155

FOREIGN PATENT DOCUMENTS

CN           1975759 A        6/2007
CN         103150561 A        6/2013
(Continued)

OTHER PUBLICATIONS

Kisku et al, "Face Recognition by Fusion of Local and Global Matching Scores using DS Theory: An Evaluation with Uni-classifier and Multi-classifier Paradigm", 2009, IEEE, pp. 60-65.*
(Continued)

*Primary Examiner* — Edward Park
(74) *Attorney, Agent, or Firm* — Seed IP Law Group LLP

(57) ABSTRACT

A method and a system for recognizing faces have been disclosed. The method may comprise: retrieving a pair of face images; segmenting each of the retrieved face images into a plurality of image patches, wherein each patch in one image and a corresponding one in the other image form a pair of patches; determining a first similarity of each pair of patches; determining, from all pair of patches, a second similarity of the pair of face images; and fusing the first similarity determined for the each pair of patches and the second similarity determined for the pair of face images.

13 Claims, 7 Drawing Sheets

(52) U.S. Cl.
CPC ......... *G06K 9/00288* (2013.01); *G06K 9/469* (2013.01); *G06K 9/6215* (2013.01)

(56) References Cited

FOREIGN PATENT DOCUMENTS

| CN | 103207986 A | 7/2013 |
|---|---|---|
| JP | 2008-251039 A | 10/2008 |
| JP | 2012-243196 A | 12/2012 |

OTHER PUBLICATIONS

Ji, et, al, "Local Regression Model for Automatic Face Sketch Generation", 2011, IEEE, pp. 412-417.*
Xia, et al, "RW.KNN: A Proposed Random Walk KNN Algorithm for Multi-label Classification", 2011, ACM, pp. 87-90.*
Ahonen et al., "Face Recognition with Local Binary Patterns," 8th *European Conference on Computer Vision*, Prague, Czech Republic, May 11-14, 2004, pp. 469-481.
Belhumeur et al., "Eigenfaces vs. Fisherfaces: Recognition Using Class Specific Linear Projection," *IEEE Transactions on Pattern Analysis and Machine Intelligence* 19(7):711-720, 1997.
Berg et al., "Tom-vs-Pete Classifiers and Identity-Preserving Alignment for Face Verification," *Proceedings of the British Machine Vision Conference,* Guildford, England, Sep. 3-7, 2012, pp. 1-11.
Cao et al., "Face Recognition with Learning-based Descriptor," *IEEE Computer Society Conference on Computer Vision and Pattern Recognition*, San Francisco, USA, Jun. 12-18, 2010, pp. 2707-2714.
Chang et al., "LIBSVM: A Library for Support Vector Machines," *ACM Transactions on Intelligent Systems and Technology* 2(3):27:1-27:27, 2011. (39 pages).
Cox et al., "Beyond Simple Features: A Large-Scale Feature Search Approach to Unconstrained Face Recognition," *IEEE International Conference on Automatic Face & Gesture Recognition and Workshops*, Santa Barbara, USA, Mar. 21-25, 2011, pp. 8-15.
Dalal et al., "Histograms of Oriented Gradients for Human Detection," *IEEE Computer Society Conference on Computer Vision and Pattern Recognition*, San Diego, USA, Jun. 20-25, 2005, pp. 886-893.
Georghiades et al., "From Few to Many: Generative Models for Recognition Under Variable Pose and Illumination," *IEEE International Conference on Automatic Face & Gesture Recognition*, Grenoble, France, Mar. 28-30, 2000, pp. 277-284.
Georghiades et al., "From Few to Many: Illumination Cone Models for Face Recognition under Variable Lighting and Pose," *IEEE Transactions on Pattern Analysis and Machine Intelligence* 23(6):643-660, 2001.
Gross et al., "Multi-PIE," *IEEE International Conference on Automatic Face & Gesture Recognition*, Amsterdam, Netherlands, Sep. 17-19, 2008, pp. 1-8.
Hua et al., "A Robust Elastic and Partial Matching Metric for Face Recognition," *IEEE 12th International Conference on Computer Vision*, Kyoto, Japan, Sep. 27-Oct. 4, 2009, pp. 2082-2089.
Huang et al., "Labeled Faces in the Wild: A Database for Studying Face Recognition in Unconstrained Environments," *University of Massachusetts Technical Report* 07(49):1-11, 2007.
Kandola et al., "Learning Semantic Similarity," *Neural Information Processing Systems*, Vancouver, Canada, Dec. 9-14, 2002, pp. 657-664.
Katz, "A New Status Index Derived From Sociometric Analysis," *Psychometrika* 18(1):39-43, 1953.
Kumar et al., "Attribute and Simile Classifiers for Face Verification," *IEEE 12th International Conference on Computer Vision*, Kyoto, Japan, Sep. 27-Oct. 4, 2009, pp. 365-372.

Li et al., "Nonparametric Discriminant Analysis for Face Recognition," *IEEE Transactions on Pattern Analysis and Machine Intelligence* 31(4):755-761, 2009. (8 pages).
Newman, *Networks: An Introduction*, Oxford Scholarship Online, 2010. (Abstract) (3 pages).
Ojala et al., "Multiresolution Gray Scale and Rotation Invariant Texture Classification with Local Binary Patterns," *IEEE Transactions on Pattern Analysis and Machine Intelligence* 24(7):971-987, 2002. (35 pages).
Pinto et al., "How far can you get with a modern face recognition test set using only simple features?," *IEEE Computer Society Conference on Computer Vision and Pattern Recognition*, Miami, USA, Jun. 20-25, 2009, pp. 2591-2598.
Prince et al., "Tied factor analysis for face recognition across large pose changes," *IEEE Transactions on Pattern Analysis and Machine Intelligence* 30(6):970-984, 2008. (10 pages).
Roweis et al., "Nonlinear Dimensionality Reduction by Locally Linear Embedding," *Science* 290 :2323-2326, 2000. (5 pages).
Saul et al., "Think Globally, Fit Locally: Unsupervised Learning of Low Dimensional Manifolds," *Journal of Machine Learning Research* 4:119-155, 2003.
Seung et al., "The Manifold Ways of Perception," *Science* 290:2268-2269, 2000.
Sim et al., "The CMU Pose, Illumination, and Expression Database," *IEEE Transactions on Pattern Analysis and Machine Intelligence* 25(12):1615-1618, 2003.
Sudha, "Robust Hausdorff distance measure for face recognition," *Pattern Recognition* 40:431-442, 2007.
Tenenbaum et al., "A Global Geometric Framework for Nonlinear Dimensionality Reduction," *Science* 290:2319-2323, 2000.
Turk et al., "Face Recognition Using Eigenfaces," *IEEE Computer Society Conference on Computer Vision and Pattern Recognition*, Maui, USA, Jun. 3-6, 1991, pp. 586-591.
Wang et al., "A Unified Framework for Subspace Face Recognition," *IEEE Transactions on Pattern Analysis and Machine Intelligence* 26(9):1222-1228, 2004.
Wang et al., "Manifold-Manifold Distance with Application to Face Recognition based on Image Set," *IEEE Computer Society Conference on Computer Vision and Pattern Recognition*, Anchorage, USA, Jun. 23-28, 2008, pp. 1-8.
Wang et al., "Random Sampling for Subspace Face Recognition," *International Journal of Computer Vision* 70(1):91-104, 2006.
Wiskott et al., "Face Recognition by Elastic Bunch Graph Matching," *Intelligent Biometric Techniques in Fingerprint and Face Recognition*:355-396, 1999. (23 pages).
Wolf et al., "Descriptor Based Methods in the Wild," *Faces in Real-Life Images Workshop at the 10th European Conference on Computer Vision*, Marseille, France, Oct. 12-18, 2008, pp. 1-14.
Yin et al., "An Associate-Predict Model for Face Recognition," *IEEE Computer Society Conference on Computer Vision and Pattern Recognition*, Colorado Springs, USA, Jun. 20-25, 2011, pp. 497-504.
Zhu et al., "Deep Learning Identity-Preserving Face Space," *IEEE 14th International Conference on Computer Vision*, Sydney, Australia, Dec. 1-8, 2013, pp. 113-120.
International Search Report, dated Sep. 19, 2014, for PCT/CN20013/088255, 4 pages.
Yi, et al., "A Face Recognition Algorithm Based on Global and Local Feature Fusion," *Journal of Information & Computational Science* 7(2):593-600, Feb. 2010.
Extended European Search Report, dated May 19, 2017, for European Application No. 13898244.2—1901/3074919, 5 pages.
Lu et al., "Face Recognition Using Face Patch Networks," *2013 IEEE International Conference on Computer Vision*, CV Foundation, Nov. 9, 2013, pp. 3288-3295.
Index of /openaccess/content_iccv_2013/papers, http://www.cv-foundation.org/openaccess/content_iccv_2013/papers/, retrieved May 5, 2017, 8 pages.

* cited by examiner

METHOD AND SYSTEM FOR RECOGNIZING FACES

TECHNICAL FIELD

The present application refers to a method and a system for recognizing faces.

BACKGROUND

Over the past two decades, face recognition has been studied extensively. However, large intra-personal variations, such as pose, illumination and expression, remain challenging for robust face recognition in real-life photos.

Classical measurement approaches for face recognition have several limitations, which have restricted their wider applications in the scenarios of large intra-personal variations. For example, in the art these have been disclosed a method of the diverse distributions of face images for one person. In fact, these distributions generally have different densities, sizes, and shapes, due to the high complexity in face data. In addition, noise and outliers are often contained in face space. The current measurement approaches fail to tackle all of these challenges. Many methods based on (dis-)similarity measures directly use pair wise distances to compute the (dis-)similarities between faces, which cannot capture the structural information for the high-quality discrimination. Although some studies apply the structural information in measurements, the developed algorithms are, generally speaking, sensitive to noise and outliers. For instance, computing the length of the shortest path in a network is very sensitive to noisy nodes.

SUMMARY

This present application proposes a new face similarity measure called random path (RP) measure, which was designed to overcome the above-mentioned problems. Two novel face patch networks: the in-face network and the out-face network, have been also disclosed.

In some embodiments of the present application, faces are divided into multiple overlapping patches of the same size. The in-face network is defined for any pair of faces. For each pair of faces, at each patch location, the two corresponding patch pairs and their eight neighboring patches are utilized to form a KNN graph called as in-face network. For each such in-face network, a random path (RP) measure is proposed as the patch similarity of the corresponding patch pair. Given a network, all paths between arbitrary two nodes are integrated by a generating function. The RP measure includes all paths of different lengths in the network, which enables it to capture more discriminative information in faces and significantly reduce the effect of noise and outliers. For a pair of faces with M patches, therefore, M RP measures are determined to form the similarity feature vector between the two faces. Since the network is only constructed within two faces in this approach, it is called as in-face network. In this disclosure, it also refers to the first KNN.

The out-face network (the second KNN) is built in a similar fashion. Instead of using local neighboring patches to form the network, for each patch we search a database of face patches and find similar patches in the same location neighbors of the patch and their 8 neighbors to form the patch pair network. Since the search is conducted globally over the training space, the out-face network captures more global structural information. Because the two networks describe the local and global structural information respectively, the similarities derived from the RP measure on these two networks can be combined to boost the recognition performance. By means of the RP measure on the in-face and outface networks, the RP measure performs significantly better than existing measures for face verification on two challenging face datasets.

In one aspect, the present application provides a method for recognizing faces, comprising:

retrieving a pair of face images;

segmenting each of the retrieved face images into a plurality of image patches, wherein each patch in one image and a corresponding one in the other image form a pair of patches;

determining a first similarity of each pair of patches;

determining, from all pair of patches, a second similarity of the pair of face images; and fusing the first similarity determined for the each pair of patches and the second similarity determined for the pair of face images.

In an example, the step of determining a first similarity of each pair of patches comprises:

obtaining each of the pair of patches and K adjacent patches surrounding the obtained patches, where K is integer and more than 1;

forming a first KNN from the obtained patches; and determining the first similarity of each pair of patches in the formed first KNN.

In another example, the first similarity is determined by performing random walks in the formed first KNN.

In another example, the step of determining, from all pair of patches, a second similarity comprises:

obtaining each of pair of patches from the plurality of image patches;

obtaining a plurality of adjacent patches surrounding the obtained patches in a second KNN;

retrieving, from the second KNN, sub networks for the adjacent patches; and determining the second similarity in the retrieved subnetworks.

In another example, the above method further comprises a step of forming the second KNN, which comprises:

retrieving N training face images, where N is integer and more than 1;

segmenting each of the training face images into M patches of image;

forming MKNNs from the segmented patches for M image patches of N training face images;

linking each patch to its adjacent patches in each of formed KNN, so as to form the second KNN.

In another example, the second similarity is determined by performing random walks in the network.

In another example, the each of the first and the second similarity is determined by:

determining a first sub-network $G_i$ formed by said patches, a second sub-network $G_j$ formed by said patches, and a combination network of the first and the second sub-network $G_i \cup G_j$;

determining adjacency matrices for the $G_i$, $G_j$ and $G_i \cup G_j$, respectively;

determining path centralities $C_{G_i}$, $C_{G_j}$ and $$C_{G_i \cup G_j}$$

for the determined adjacency matrices, respectively;

determining the corresponding similarity between of $G_i$ and $G_j$ by rule of $$\Phi_{G_i \cup G_j} = C_{G_i \cup G_j} - (C_{G_i} + C_{G_j}).$$

The provided method may be implemented by one or more processors in a computer.

In another aspect, the present application provides system for recognizing face, comprising:

a segmenting unit configured to retrieve a pair of face images and segment each of the face images into a plurality of patches of image, each patch in one image and a corresponding one in the other image form a pair of patches;

a first similarity determining unit configured to determine a first similarity of each pair of patches;

a second similarity determining unit configured to determine, from all pair of patches, a second similarity of the pair of face images; and a fusing unit configured to fuse the first similarity determined for the each pair of patches and the second similarity determined for the pair of face images.

In an example, the first similarity determining unit is configured to, obtain each of the pair of patches and K adjacent patches surrounding the obtained patches, where K is integer and more than 1;

form a first KNN from the obtained patches; and determine the first similarity of each pair of patches in the formed first KNN.

In another example, the first similarity is determined by performing random walks in the formed first KNN.

In another example, the first similarity is determined by:

determining a first sub-network $G_i$ formed by said patches, a second sub-network $G_j$ formed by said patches, and a combination network of the first and the second sub-network $G_i \cup G_j$;

determining adjacency matrices for the $G_i$, $G_j$ and $G_i \cup G_j$, respectively;

determining path centralities $C_{G_i}$, $C_{G_j}$ and $$C_{G_i \cup G_j}$$

for the determined adjacency matrices, respectively;

determining the first similarity between of $G_i$ and $G_j$ by rule of $$\Phi_{G_i \cup G_j} = C_{G_i \cup G_j} - (C_{G_i} + C_{G_j}).$$

In another example, the second similarity determining unit is configured to, obtain each of pair of patches from the plurality of image patches;

obtain a plurality of adjacent patches surrounding the obtained patches in a second KNN;

retrieve, from the second KNN, sub networks for the adjacent patches; and determine the second similarity in the retrieved sub-networks.

In another example, the second similarity determining unit operates to form the second KNN by:

retrieving N training face images, where N is integer and more than 1;

segmenting each of the training face images into M patches of image;

forming M KNNs from the segmented patches for M image patches of N training face images;

linking each patch to its adjacent patches in each of formed KNN, so as to formed the second KNN.

In another example, the second similarity is determined by performing random walks in the network.

In another example, the second similarity is determined by: determining a first sub-network $G_i$ formed by said patches, a second sub-network $G_j$ formed by said patches, and a combination network of the first and the second sub-network $G_i \cup G_j$;

determining adjacency matrices for the $G_i$, $G_j$ and $G_i \cup G_j$, respectively;

determining path centralities $C_{G_i}$, $C_{G_j}$ and $$C_{G_i \cup G_j}$$

for the determined adjacency matrices, respectively; and determining the second similarity between of $G_i$ and $G_j$ by rule of $$\Phi_{G_i \cup G_j} = C_{G_i \cup G_j} - (C_{G_i} + C_{G_j}).$$

In another aspect, the present application provides a computer readable storage media comprising:

instructions for retrieving a pair of face images;

instructions for segmenting each of the retrieved face images into a plurality of image patches, wherein each patch in one image and a corresponding one in the other image form a pair of patches;

instructions for determining a first similarity of each pair of patches;

instructions for determining, from all pair of patches, a second similarity of the pair of face images; and instructions for fusing the first similarity determined for the each pair of patches and the second similarity determined for the pair of face images.

In an example, the instructions are included in a computer program product embodied on the computer readable storage media.

In another example, the computer readable storage media is disk storage, CD-ROM or optical memory.

DETAILED DESCRIPTION

Reference will now be made in detail to exemplary embodiments, examples of which are illustrated in the accompanying drawings. When appropriate, the same reference numbers are used throughout the drawings to refer to the same or like parts.

Figure 1:
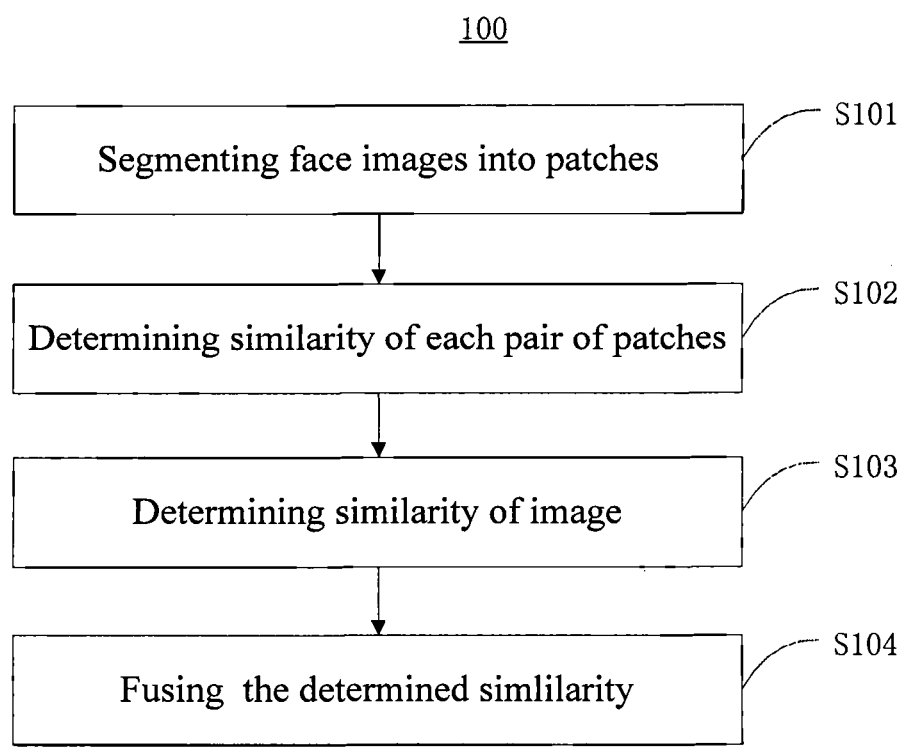
FIG. 1 illustrates a flowchart of a method for recognizing faces according to one embodiment of the present application.

FIG. 1 illustrates a flowchart of a process 100 for recognizing faces according to one embodiment of the present application, which will be discussed in details as below.
At Step S101

As shown in FIG. 1, a pair of face images is retrieved from the face image database, and then each of the face images will be segmented into a plurality of image patches, wherein each patch in one image and a corresponding one in the other image form a pair of patches. As shown in FIG. 2a, face a and face b form a pair of face images, and patch p in face a and patch q in face b form one pair of patches.
At Step S102

Figure 2:
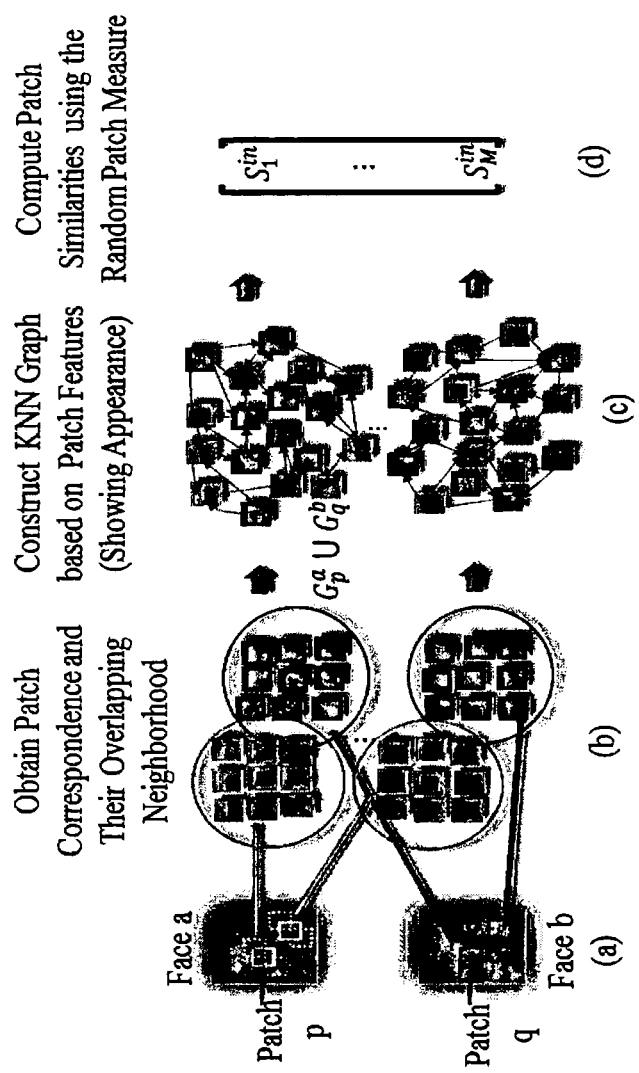
FIG. 2(a)-(d) illustrate in-face network pipeline according to one embodiment of the present application.

In this step, a first similarity of each pair of patches will be determined through a first face image KNN (K-adjacent network). In one embodiment of the present application as shown in FIG. 2, at step S1021, each of pair of patches and K adjacent patches surrounding the obtained patches are obtained, where K is integer and more than 1, and then at step S1022 a first face image KNN is formed from the obtained patches and at step S1023 the first similarity of each pair of patches in the formed first KNN is determined, which is discussed below in detail.

As is well noted in the art, a face is holistically structured. Even for a patch p cropped from the face a, its microstructure is continuously connected with that of patches around patch p. For instance, the structure of the patch of the eye corner is bridged with that of its neighboring patches, as shown in FIGS. 2(a) and (b). Therefore, it is more convincing to take the neighboring patches into consideration when locally comparing the similarity between two faces from patch pair. To do this, in the embodiment of the present application, it samples the r neighboring patches around patch p. FIG. 2(b) shows the patch examples in the case of r=8 for face a and face b. The visual semantics of local patches cropped at the same point for different faces may be highly correlated. For example, the eye corners for different faces are very similar. Therefore, the 2×(r+1) neighbor patches may be spatially mixed if they are presented as spatial vector points. To model such mixing structures, the mixing patches are locally connected according to their spatial positions in feature space by a KNN network. FIG. 2 (c) shows a 2-NN network of facial patches. The network constructed between two faces is called in-face network.

FIG. 2(c) shows that some patches of the same person are not directly linked. To model the structure in such case, we apply paths to connect the distant nodes in the network. Path-based measurements are widely employed in social networks to compute the nodal similarities. For instance, each entry of $(I-zP)^{-1}$ presents the global similarity for the corresponding nodes, where P is the adjacency matrix of the network. The nodal similarity is defined by all the connected paths between nodes. With the similarity matrix $(I-zP)^{-1}$, the structural compactness of the network may be measured by the average similarity between all nodes. To this end, the path centrality may be defined as:

$$C_G = \frac{1}{N} 1^T (I - zP)^{-1} 1. \qquad 1)$$

The more compact the network is, the larger the path centrality is. With path centrality $C_G$, it will be easy to measure the similarity of patch pair in the network framework. To make the analysis clearer, let $G_p^a \cup G_q^b$ denote the network constructed from patch p in face a and patch q in face b, where $G_p^a$ is the sub-network of patch p and $G_q^b$ is the sub-network of patch q. It is straightforward to know that the more similar the patch p and the patch q are, the more mutually connected paths there are between $G_p^a$ and $G_q^b$. Therefore, the increment of the path centrality $$C_{G_p^a \cup G_q^b}$$

will be large over $$C_{G_p^a} \text{ and } C_{G_q^b}$$

of the sub-networks, which motivates us to define the random path measure $$C_{G_p^a \cup G_q^b} - C_{G_p^a} - C_{G_q^b}$$

for measuring the similarity of patch pair. The random path measure will be discussed later separately.

Returning to FIG. 2 again, in the embodiment of the present application, the face image is densely segmented into M=K×K overlapping patches of size n×n (n=16 in our settings). For example, we may set 8-pixel overlap, and apply a local image descriptor to extract features for each patch of size n×n. Therefore, each face is represented by a set of M=K×K feature vectors formed from a local image descriptors $$F = \{f_{11}, \ldots, f_{ij}, \ldots, f_M\}, \qquad 2)$$

Where $f_{ij}$ is the feature vector of the patch located at (i, j) in the face. $F^a$ and $F^b$ denote the feature sets of face a and face b, respectively. To build an in-face network for the patches at (i, j), it takes $f_{ij}^a$ in $F^a$ and $f_{ij}^b$ in $F^b$. At the same time, the r neighbors of $f_{ij}^a$ around (i, j) are also taken. The same operation is also performed for $f_{ij}^b$. For example, r=8 i. Thus, (2+2r) feature vectors of patches which are utilized to construct a KNN network $G_{ij}$ for the patch pair of $f_{ij}^a$ and $f_{ij}^b$ will be obtained. Its weighted adjacency matrix is denoted by $P_{G_{ij}}$. Therefore, the adjacency matrix $P_{G_{ij}^a}$ of the network $G_{ij}^a$ corresponding to $f_{ij}^a$ and its r neighbors is the sub-matrix of $G_{ij}$ identified by the indices of $f_{ij}^a$ and its r neighbors.

Similarly, $G_{ij}^b$ and its adjacency matrix $P_{G_{ij}^b}$ is obtained. For better understanding, the present application defines $G_{ij}=G_{ij}^a \cup G_{ij}^b$, which means the set of nodes of $G_{ij}$ are the union of that of $G_{ij}^a$ and $G_{ij}^b$. For the patch pair of $f_{ij}^a$ and and $f_{ij}^b$, their path centralities are calculated as follows:

$$C_{G_{ij}^a} = \frac{1}{|G_{ij}^a|}1^T(I-zP_{G_{ij}^a})^{-1}1, \quad C_{G_{ij}^b} = \frac{1}{|G_{ij}^b|}1^T(I-zP_{G_{ij}^b})^{-1}1, \quad (3)$$

$$C_{G_{ij}^a \cup G_{ij}^b} = C_{G_{ij}} = \frac{1}{|G_{ij}|}1^T(I-zP_{G_{ij}})^{-1}1,$$

And then, the RP measure is applied to obtain the similarity measure of the patch pair $$S_{ij}^{in} = \Phi_{G_{ij}^a \cup G_{ij}^b} = C_{G_{ij}^a \cup G_{ij}^b} - (C_{G_{ij}^a} + C_{G_{ij}^b}) \quad (4)$$

Analogous to this manipulation, the similarities of M patch pairs from $F^a$ and $F^b$ can be derived. The similarities may be padded as a similarity vector $$s^{in}=[S_{11}^{in}, \ldots, S_{ij}^{in}, \ldots, S_M^{in}] \quad (5)$$

The above discussed network is referred as the in-face network because the network is only constructed within two face images. Only the structural information of patch pair and their neighborhoods is considered, and thus in-face network mainly conveys the local information.

At Step S103

In this step, a second similarity of the pair of face images will be obtained from all pair of patches through a second face image KNN. In the present application, the second face image KNN is also referred as out-face network.

Figure 3:
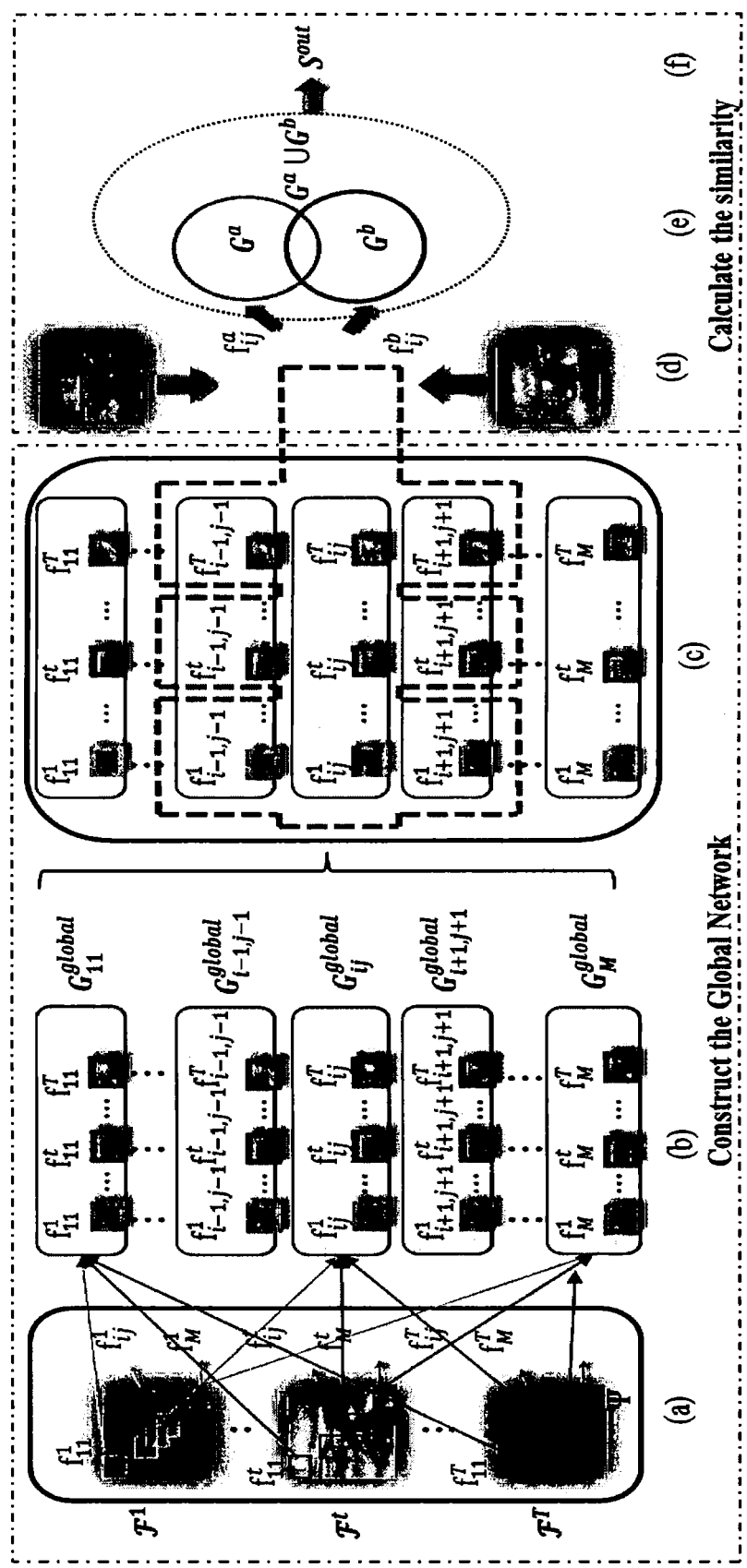
FIG. 3(a)-(f) illustrate out-face network pipeline according to one embodiment of the present application.
Figure 6:
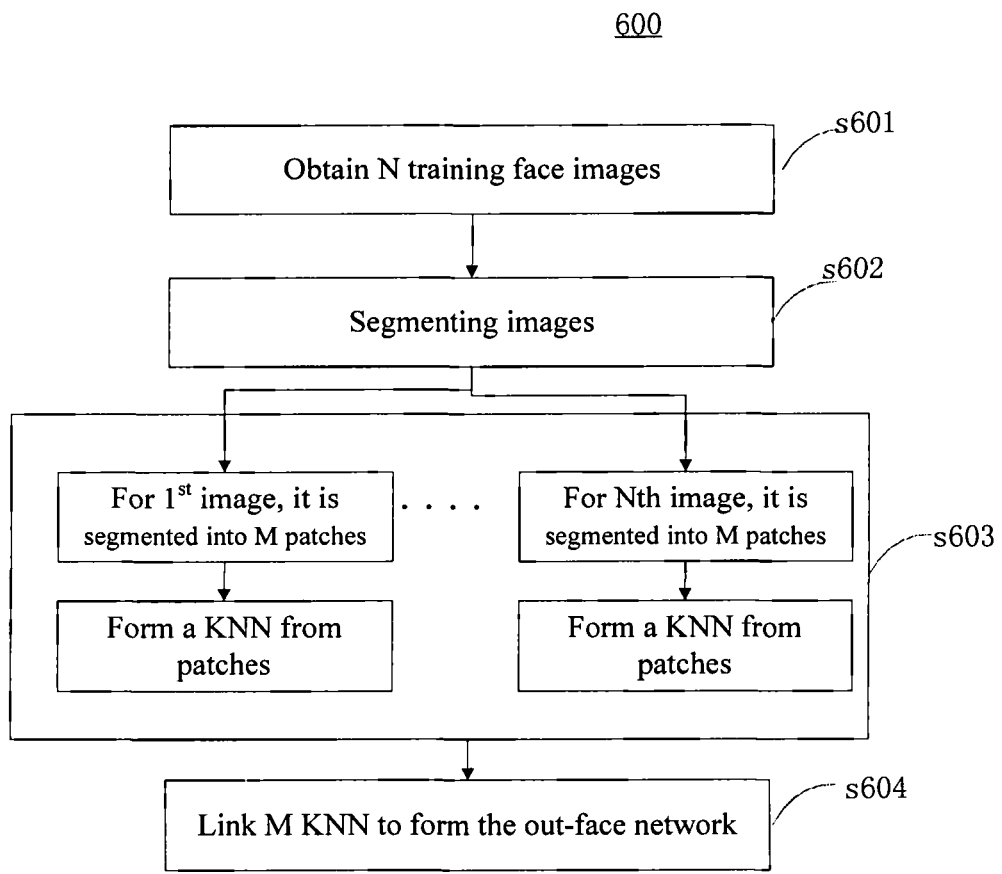
FIG. 6 illustrates a flowchart of a method for forming the out-face network according to one embodiment of the present application.

For many faces, there also exists the correlation between the same components of different faces. For example, Peter's eyes look like Tom's. To model such structural correlation, we further construct a network from the patches at the same positions of all faces. Thus we can build the M networks if there are M different patches in one face, as FIGS. 3(a) and (b) illustrate. To integrate these component networks, for each patch in a face, we link it with its r most similar patches in the neighbor position in the training data, as illustrated in FIG. 3(c). Thus we derive a global network that cover the structural correlation between faces and within faces as the out-face network. In particular, as shown in FIG. 6 the out-face network may be obtained by retrieving N training face images from the image database at step s601; segmenting each of the training face images into M patches of image at step s602; forming M KNNs from the segmented patches for M image patches of N training face images (M<N) at step s603; and linking each patch to its adjacent patches in each of formed KNN, so as to formed the second KNN at step s604.

Unlike the in-face network, the construction of the out-face network requires the training data in an unsupervised way. The patch segment and feature extraction is performed in the same way as discussed in step S102.

Suppose that T is the number of face images in the training set. Write the feature set as $$\Psi=\{F^1, \ldots, F^T\}, \quad (6)$$

Where $F^t$ is the feature set of the t-th face. It first adopts all the feature vectors $\{f_{ij}^1, \ldots, f_{ij}^T\}$ at (i, j) in the training set to construct a KNN network $G_{ij}^{global}$ as the second KNN (out-face network). In this way, M $\text{in}$-dependent $G_{ij}^{global}$ is constructed, meaning that there is no connection between them. to preserve the structural proximity between $f_{ij}^t$ and its neighbors at (i, j) in each face, $f_{ij}^t$ is connected with all of its 8 neighbors. Here "connect" means: when a patch is selected, all its r neighbors will also be selected. Therefore, by the connections of neighborhoods, the M independent $G_{ij}^{global}$ are linked together to form the final global network $G^{global}$ with the weighted adjacency matrix $P^{global}$.

The weight $P(i, j)$ of the edge connecting node $x_i$ and node $x_j$ in the network is defined as $$P(i,j) = \begin{cases} \exp\left(\frac{dist(x_i, x_j)^2}{\sigma^2}\right), & \text{if } x_j \in N_i^K \\ 0, & \text{otherwise} \end{cases} \quad (8)$$

Where $dist(x_i, x_j)$ is the pair wise distance between $x_i$ and $x_j$, $N_i^K$ is the set of KNNs of $x_i$, and $$\sigma^2 = \frac{1}{nK}\left[\sum_{i=1}^n \sum_{x_j \in N_i^K} dist(x_i, x_j)^2\right].$$

To get the transition probability matrix, it needs to perform $P(i, j) \leftarrow P(i, j)/\Sigma_{j=1}^n P(i, j)$.

Figure 5:
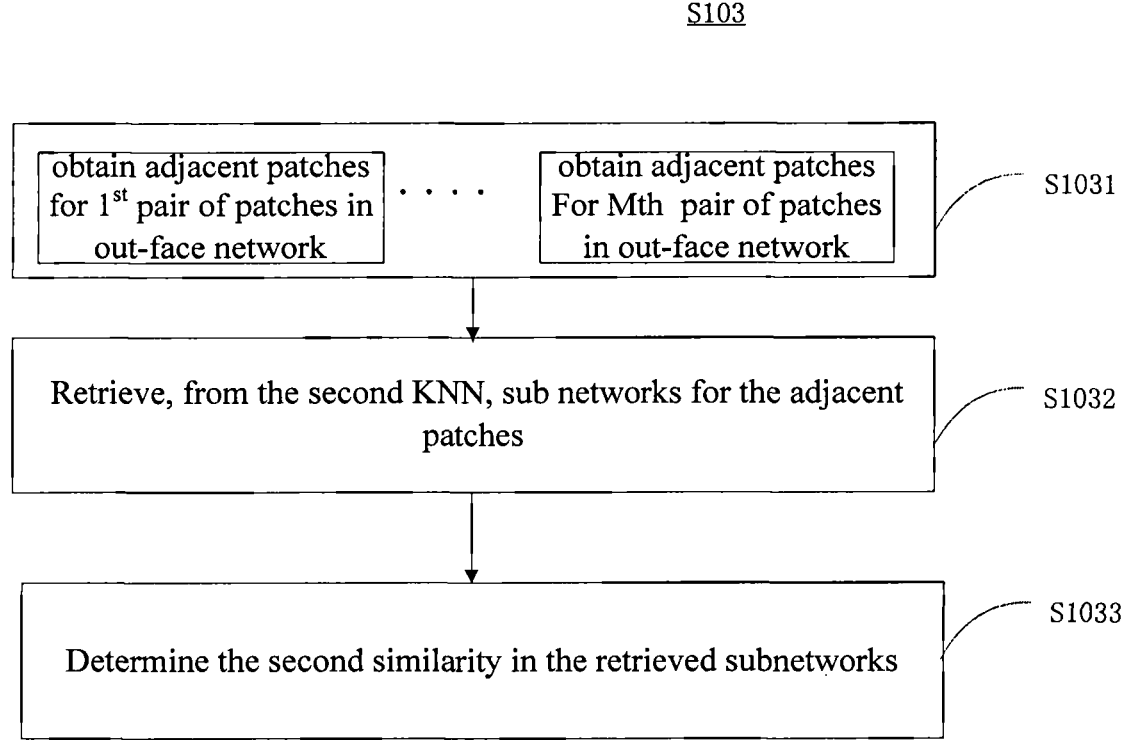
FIG. 5 illustrates a flowchart of a method for determining the similarity of a pair of face images in the out-face network according to one embodiment of the present application.

FIG. 5 illustrates a flowchart of a method for determining the similarity of a pair of face images in the out-face network according to one embodiment of the present application. At step S1031, it also obtains each of pair of patches and to obtain a plurality of adjacent patches surrounding the obtained patches, and then at step S1032, sub networks for the adjacent patches is retrieved from a second KNN, in which the similarity of the pair of face images will be determined from all pair of patches at step S1033.

Referring to FIG. 2(b) again, given a test face image a, its $r^{NN}$ most similar patches in $G_{ij}^{global}$ will be searched for each $f_{ij}^a$, and then for each selected patch, its 8 neighbor patches will be selected together to form the initial $G^a$. This search method can guarantee that the acquired similar patches are among the spatially semantic neighbors of $f_{ij}^a$ in other face images. Thus, $(r^{NN}+1)\times M$ patch nodes are finally selected from $G^{global}$. In one embodiment, some duplicates are deleted from them and the remaining nodes are used to extract the sub-network $G^a$ from $G^{global}$ with its corresponding sub-matrix $P_{G^a}$ from $P^{global}$. $G^b$ and $P_{G^b}$ can be acquired in the same way for face b. By merging nodes in $G^a$ and $G^b$, the union network $G^a \cup G^b$ and its adjacency matrix $P_{G^a \cup G^b}$ can be drawn from $G^{global}$ and $P^{global}$.

After acquiring $P_{G^a}$, $P_{G^b}$, and $P_{G^a \cup G^b}$ for face a and face b, it is straightforward to compute their path centralities: $C_{G^a}$, $C_{G^b}$, and $C_{G^a \cup G^b}$ according to Definition 1. The RP measure is then applied to calculate their similarity $$s^{out} = \Phi_{G^a \cup G^b}.$$

The similarity $s^{out}$ describes the structural information of two face images from the global view.

Since the construction of this network requires the training data and the each test face needs to be projected on it, the network is the called as the out-face network. Searching for the nearest neighbors for each patch is fast because the search operation is only made in $G_{ij}^{global}$ instead of $G^{global}$.

At Step S104

From the analysis above, it is clear that the in-face network and the out-face network are structurally complementary. To improve the discriminative capability of the networks, a simple fusion method is used to combine the first similarity $s^{in}$ as obtained in step S102 and the second similarity $s^{out}$ as obtained in step S103 by $$s^{final} = [\alpha s^{in}, (1-\alpha) s^{out}] \quad (7)$$

Where $s^{final}$ is the combined similarity vector of two face images, and $\alpha$ is a free parameter learned from the training data. For example, $\alpha=0.5$. This fusion/combination method can effectively combine the advantages of the in-face network and the out-face network. The combined $s^{final}$ may be feed to the conventional linear SVM (Support Vector Machine) to train a classifier for recognition.

In one embodiment of the present application, the process 100 may further comprise a step (not shown) of recognizing the face image. To do this, a liner mode shall be obtained by inputting N pairs of weighted similarity vector $s^{final}$ together with their corresponding label (which may be 0 or 1) into a linear support vector machine. And then, the vector $s^{final}$ of the two faces is inputted into the linear support vector machine mode to determine if the two faces belong to the label of one person. For example, 0 means they belong to the same person, 1 means they belong to the different persons, vice versa.

Hereinafter, the Random Path Measure as proposed in the present application will be discussed.

Let G denote a network with N nodes $\{x_1, \ldots, x_N\}$, and P denote its weighted adjacency matrix. Each entry in the matrix P is the similarity between associated nodes. For generality, G is assumed to be directed, which means that P may be asymmetric. A path of length t defined on P is denoted by $p_t = \{v_0 \to v_1 \to \ldots \to v_{t-1} \to v_t\}$. $S_t$ is the set of all paths of length t. Let T denote the transpose operator of a matrix, 1 denote the all-one vector, and I denote the identity matrix.

Inspired by concepts in social network analysis as disclosed in the art, the definition of path centrality $C_G$ for the network G will be introduced.

Definition 1 Path Centrality $$C_G = \frac{1}{N} 1^T (I - zP)^{-1} 1, \text{ where } z < \frac{1}{\rho(P)}$$

and $\rho(P)$ is the spectral radius of P.

The (i, j) entry of the matrix $(I-zP)^{-1}$ represents a kind of global similarity between node $x_i$ and node $x_j$. It was introduced to measure the degree of influence of an actor in a social network. To make it clear, we expand $(I-zP)^{-1}$ and view it as a generating matrix function Each entry in the matrix $P^t$ can be written as $$P^t_{i,j} = \sum_{\substack{p_t \in S_t \\ v_0=i, v_t=j}} \prod_{k=0}^{t-1} P_{v_k, v_{k+1}} \quad (10)$$

which is the sum of the products of the weights over all paths of length t that start at node $x_i$ and end at node $x_j$ in G. In machine learning, the global similarity defined by the above is also called the semantic similarity in the art. In our framework, the weighted adjacency matrix P satisfies that each entry is non-negative and each row sum is normalized to 1. Therefore, we can view the entry $P_{i,j}^t$ as the probability that a random walker starts from node $x_i$ and arrives at node $x_j$ after t steps. From this point of view, the path centrality is to measure the structural compactness of the network G by all paths of all lengths between all the connected nodes in G. Due to the randomness of walks in G, which is also called as the random path measure.

With the definition of path centrality, the RP measure can be naturally used to compute the similarity between two networks. From the definition of path centrality, it makes sense that the two sub-networks in G have the most similar structures in the sense of path centrality if they share the most paths. In other words, from the viewpoint of structural recognition, the two networks are most relevant. Therefore, for two given networks $G_i$ and $G_j$, the definition of the RP measure can be defined as follows.

Definition 2 Random Path Measure $$\Phi_{G_i \cup G_j} = C_{G_i \cup G_j} - (C_{G_i} + C_{G_j}),$$

is regarded as the similarity between two networks $G_i$ and $G_j$.

Figure 4:
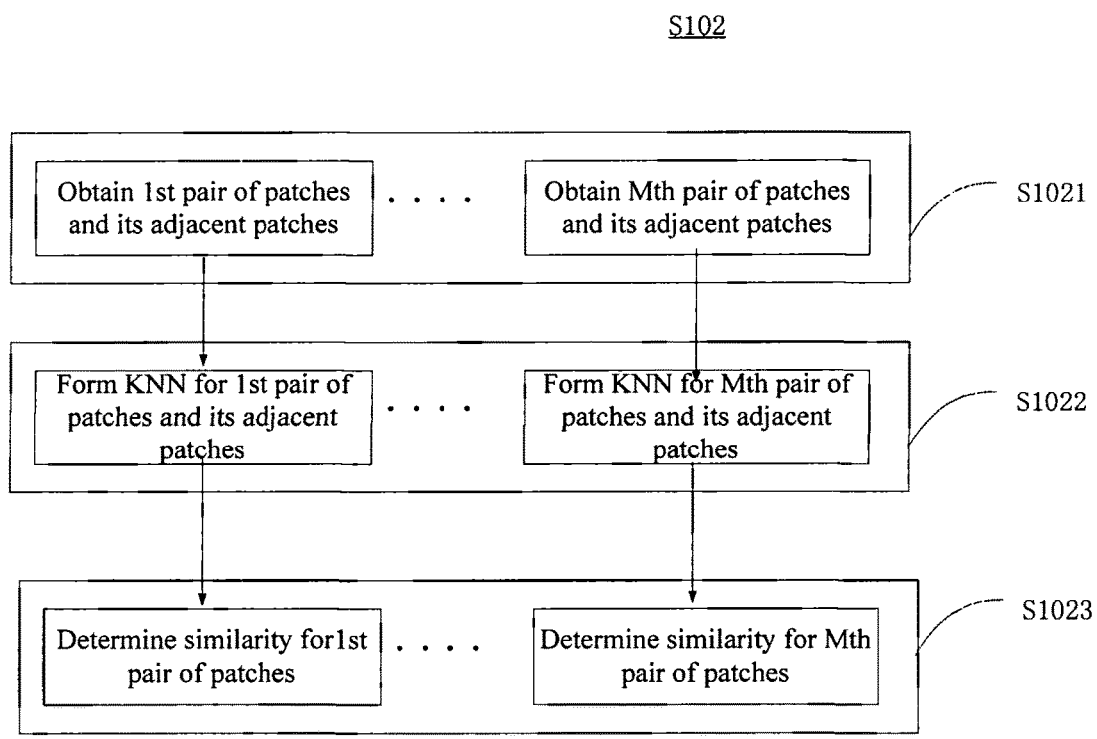
FIG. 4 illustrates a flowchart of a method for determining the similarity of each pair of patches in the in-face network according to one embodiment of the present application.

In the definition above, the union path centrality $$C_{G_i \cup G_j}$$

is written as $$C_{G_i \cup G_j} = \frac{1}{|G_i \cup G_j|} 1^T (I - zP_{G_i \cup G_j})^{-1} 1$$

Where $$P_{G_i \cup G_j}$$

is the union adjacency matrix corresponding to the nodes in $G_i$ and $G_j$. The RP measure $$\Phi_{G_i \cup G_j}$$

embodies the structural information about all paths between $G_i$ and $G_j$. In order to understand the definition intuitively, we consider a case shown in FIG. 4. $C_{G_i}$ and $C_{G_j}$ measure the structural information in $G_i$ and $G_j$, respectively.

$$C_{G_i \cup G_j}$$

measures not only the structural information within $G_i$ and $G_j$, but also that through all paths between $G_i$ and $G_j$. The larger the value of $$\Phi_{G_i \cup G_j},$$

the more structural information the two networks share, meaning that these two networks have more similar structures. Therefore, $$\Phi_{G_i \cup G_j}$$

can be exploited to measure the structural similarity between two networks.

The RP measure takes all paths between two networks into consideration to measure their similarity, not only the shortest path. Therefore, our measure is robust to noise and outliers. Besides, we take the average value of nodal centrality $(I-zP)^{-1}1$. With this operation, the structural information of network is distributed to each node, which means that the RP measure is also insensitive to multiple distributions and multiple scales.

In the above, the method for recognizing faces has been discussed. Hereinafter, a system 200 for recognizing face will be discussed in reference to FIG. 7.

Figure 7:
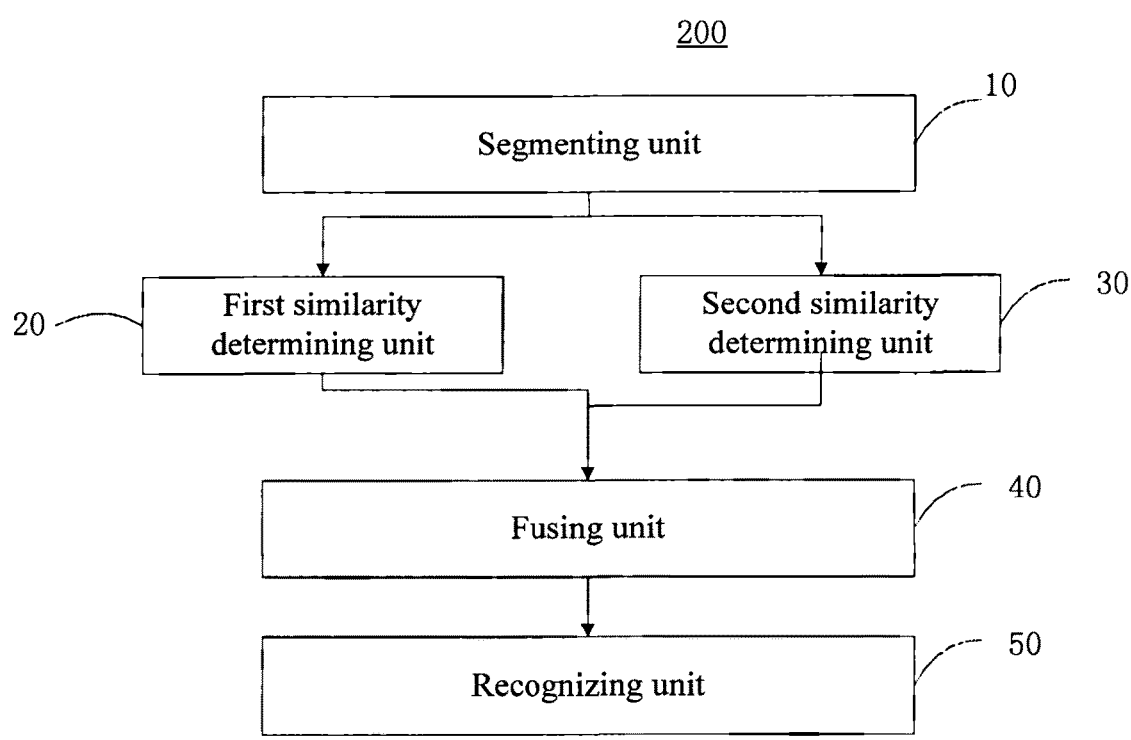
FIG. 7 illustrates block view of the exemplary system for determining the similarity of each pair of patches in the in-face network according to one embodiment of the present application.

As shown in FIG. 7, the system 200 comprises a segmenting unit 10, a first similarity determining unit 20, a second similarity determining unit 30, a fusing unit 40 and a recognizing unit 50.

The segmenting unit 10 is configured to retrieve a pair of face images and segment each of the face images into a plurality of patches of image, each patch in one image and a corresponding one in the other image form a pair of patches, as discussed in step S101.

The first similarity determining unit 20 is configured to determine a first similarity of each pair of patches. In the present application, the first similarity of each pair of patches may be determined through the in-face network by obtaining each of pair of patches and K adjacent patches surrounding the obtained patches, where K is integer and more than 1; forming a first KNN from the obtained patches; and determining the first similarity of each pair of patches, as discussed in step S102, The second similarity determining unit 30 is configured to determine a second similarity of the pair of face images from all pair of patches. In particular, the second similarity determining unit 30 is configured to obtain each of pair of patches and to obtain a plurality of adjacent patches surrounding the obtained patches in a second KNN; retrieve, from the second KNN, sub networks for the adjacent patches; and determine the second similarity in the retrieved sub-networks. The second KNN refers to the above discussed out-face networks, and may be formed by retrieving N training face images from an image database; segmenting each of the training face images into M patches of image; forming M KNNs from the segmented patches for M image patches of N training face images; and linking each patch to its adjacent patches in each of formed KNN, so as to formed the second KNN. In the embodiment, the second similarity is determined by performing random walks in the second network, as discussed in the above.

The fusing unit 40 and the recognizing unit 50 are configured to fuse/combine the first similarity and the second similarity by rule of formula (7) as stated in the above.

The embodiments of the present invention may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

For example, the above mentioned method may be implemented by one or more processors to carry out the instructions stored in a computer-readable media. To be specific, the media may store instructions for retrieving a pair of face images; instructions for segmenting each of the face images into a plurality of patches of image, each patch in one image and a corresponding one in the other image form a pair of patches; instructions for determining a first similarity of each pair of patches; instructions for determining a second similarity of the pair of face images from all pair of patches; and instructions for fusing the first similarity and the second similarity, and instructions for recognizing the face images.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

What is claimed is:

1. A method for recognizing faces, comprising:
    retrieving a pair of face images;
    segmenting each of the retrieved face images into a plurality of image patches, wherein each patch in one image and a corresponding one in the other image form a pair of patches;
    determining a first similarity of each pair of patches;
    determining, from all pair of patches, a second similarity of the pair of face images; and
    fusing the first similarity determined for the each pair of patches and the second similarity determined for the pair of face images;
    wherein determining, from all pair of patches, a second similarity comprises:
        obtaining each of pair of patches from the plurality of image patches;
        obtaining a plurality of adjacent patches surrounding the obtained patches in a second KNN;
        retrieving, from the second KNN, sub networks for the adjacent patches; and
        determining the second similarity in the retrieved sub-networks.

2. The method according to claim 1, wherein determining a first similarity of each pair of patches comprises:
    obtaining each of the pair of patches and K adjacent patches surrounding the obtained patches, where K is integer and more than 1;
    forming a first KNN from the obtained patches; and
    determining the first similarity of each pair of patches in the formed first KNN.

3. The method according to claim 1, wherein the first similarity is determined by performing random walks in the formed first KNN.

4. The method according to claim 1, further comprising forming the second KNN, which comprises:
    retrieving N training face images, where N is integer and more than 1;

segmenting each of the training face images into M patches of image;

forming M KNNs from the segmented patches for M image patches of N training face images;

linking each patch to its adjacent patches in each of formed KNN, so as to form the second KNN.

5. The method according to claim 1, wherein the second similarity is determined by performing random walks in the network.

6. A system for recognizing face, comprising:

a segmenting unit configured to retrieve a pair of face images and segment each of the face images into a plurality of patches of image, each patch in one image and a corresponding one in the other image form a pair of patches;

a first similarity determining unit configured to determine a first similarity of each pair of patches;

a second similarity determining unit configured to determine, from all pair of patches, a second similarity of the pair of face images; and a fusing unit configured to fuse the first similarity determined for the each pair of patches and the second similarity determined for the pair of face images;

wherein the second similarity determining unit is configured to:

obtain each of pair of patches from the plurality of image patches;

obtain a plurality of adjacent patches surrounding the obtained patches in a second KNN;

retrieve, from the second KNN, sub networks for the adjacent patches; and determine the second similarity in the retrieved subnetworks.

7. The system according to claim 6, wherein the first similarity determining unit is configured to, obtain each of the pair of patches and K adjacent patches surrounding the obtained patches, where K is integer and more than 1;

form a first KNN from the obtained patches; and determine the first similarity of each pair of patches in the formed first KNN.

8. The system according to claim 6, wherein the first similarity is determined by performing random walks in the formed first KNN.

9. The system according to claim 6, wherein the second similarity determining unit operates to form the second KNN by:

retrieving N training face images, where N is integer and more than 1;

segmenting each of the training face images into M patches of image;

forming M KNNs from the segmented patches for M image patches of N training face images;

linking each patch to its adjacent patches in each of formed KNN, so as to formed the second KNN.

10. The system according to claim 6, wherein the second similarity is determined by performing random walks in the network.

11. A non-transitory computer readable storage medium, comprising:

instructions for retrieving a pair of face images;

instructions for segmenting each of the retrieved face images into a plurality of image patches, wherein each patch in one image and a corresponding one in the other image form a pair of patches;

instructions for determining a first similarity of each pair of patches;

instructions for determining, from all pair of patches, a second similarity of the pair of face images; and instructions for fusing the first similarity determined for the each pair of patches and the second similarity determined for the pair of face images;

wherein the instructions for determining, from all pair of patches, a second similarity of the pair of face images comprise:

instructions for obtaining each of pair of patches from the plurality of image patches;

instructions for obtaining a plurality of adjacent patches surrounding the obtained patches in a second KNN;

instructions for retrieving, from the second KNN, sub networks for the adjacent patches; and instructions for determining the second similarity in the retrieved subnetworks.

12. The non-transitory computer readable storage medium according to claim 11, wherein the instructions are included in a computer program product embodied on the non-transitory computer readable storage medium.

13. The non-transitory computer readable storage medium according to claim 11, wherein the non-transitory computer readable storage medium is disk storage, CD-ROM or optical memory.

* * * * *